United States Patent [19]
Freeman et al.

[11] Patent Number: 6,108,285
[45] Date of Patent: Aug. 22, 2000

[54] DIRECTORY STRUCTURE FOR WORM OPTICAL MEDIA

[75] Inventors: Harrison L. Freeman, Kasson; Thomas Marshall Hoag; Richard Glen Mustain, both of Rochester, all of Minn.

[73] Assignee: International Business Machines Corporation, Armonk, N.Y.

[21] Appl. No.: 07/927,788

[22] Filed: Aug. 10, 1992

Related U.S. Application Data

[63] Continuation of application No. 07/325,601, Mar. 20, 1989, abandoned.

[51] Int. Cl.$^7$ ................................. G11B 5/09; G06F 9/34
[52] U.S. Cl. ................................. 369/48; 369/59; 707/200
[58] Field of Search ................................. 369/32, 47, 48, 369/53, 59; 360/39, 48, 49; 364/200; 707/200

[56] References Cited

U.S. PATENT DOCUMENTS

| | | | |
|---|---|---|---|
| 4,468,728 | 8/1984 | Wang | 364/200 |
| 4,611,298 | 9/1986 | Schuldt | 364/900 |
| 4,682,318 | 7/1987 | Busby | 369/59 |
| 4,775,969 | 10/1988 | Osterlund | 369/53 |
| 4,783,705 | 11/1988 | Moon | 360/48 X |
| 4,791,623 | 12/1988 | Deiotte | 369/59 |
| 4,792,936 | 12/1988 | Picard | 369/59 |
| 4,792,937 | 12/1988 | Picard | 369/59 |
| 4,797,755 | 1/1989 | Baldwin | 360/48 X |
| 4,827,462 | 5/1989 | Flanagan et al. | 369/32 |
| 4,939,598 | 7/1990 | Kulakowski | 369/59 X |
| 4,947,367 | 8/1990 | Chang et al. | 364/900 |
| 4,974,197 | 11/1990 | Blount et al. | 364/900 |
| 4,987,531 | 1/1991 | Nishikado | 364/200 |
| 5,029,125 | 7/1991 | Sciupac | 364/900 |
| 5,034,914 | 7/1991 | Osterlund | 364/900 |
| 5,040,110 | 8/1991 | Miki et al. | 364/200 |

FOREIGN PATENT DOCUMENTS 0284037 2/1989 European Pat. Off. .

OTHER PUBLICATIONS

H. Deitel, "An Introduction to Operating System", 1$^{st}$ edition, 1984, pp. 322–335.
IBM, "Disk Operating System", Apr. 1987.
Wagner, Concatenated and Distributed Data Storage Directories, IBM Technical Disclosure Bulletin, vol. 27, No. 8, Jan. 1985, pp. 4613–4614.
Multilevel GTEO Storage Allocation, IBM Technical Disclosure Bulletin, vol. 27, No. 10A, Mar. 1985, pp. 5783–5785.
Incremental Directory Indexes in a Write–Once Recording Environment, IBM Technical Disclosure Bulletin, vol. 30, No. 10, Mar. 1988, pp. 344–350.
Ninth IEEE Symposium on Mass Storage Systems, Oct. 31, 1988, Monterey, USA pp. 72–76, W. Wang 'A File Structure for Non–Erasable Media'.

*Primary Examiner*—Thai Tran
*Attorney, Agent, or Firm*—Felsman, Bradley, Vaden, Gunter & Dillon, LLP

[57] ABSTRACT

A directory structure for WORM optical media which supports a multi-level tree structure containing several paths is disclosed. When a user defines the first path on the WORM volume, a file directory group is created for that path. A path directory entry pointing to this file directory group is written to the path directory group. Files having this path name are initially written into the first data file area next to this file directory group. The first data file area grows as data is written into it. When a second path is defined, the first data file area is closed and a second file directory group is created on the WORM volume next to the first data file area, thereby wasting little if any space. The path directory group is updated with a new path directory entry that points to this new file directory group. Files having this second path name are written into a growing second data area. If the user now wants a file having the first path name to be written to the disk, a file directory entry is placed in the first file directory group, but the file itself is written into the growing second data file area. In this manner, files are associated with directory entries by a common path name, not necessarily physical location on the disk, although files tend to be relatively close to their associated directory entry.

6 Claims, 15 Drawing Sheets

| Volume label block 500 | |
|---|---|
| Bytes | Description |
| 4 | Volume Label ID ('VOL1') |
| 6 | Volume Serial Number (Vol ID) |
| 2 | Format ID (5363 Type = '10' x) |
| 1 | Device Type (WORM Type = '04' x) |
| 1 | Medium Type (Removable = '80' x) |
| 2 | Reserved (Binary zeros) |
| 4 | Number of Cylinder/Volume |
| 4 | Number of Tracks/Cylinder |
| 4 | Number of Blocks/Track |
| 4 | Total Number of Blocks |
| 4 | Number of Bytes/Block |
| 8 | Date Volume Label Written (YY/MM/DD) |
| 8 | Time Volume Label Written (HH:MM:SS) |
| 8 | Reserved (Binary zeros) |
| 4 | Block address of first path directory group |
| 4 | Start Block Data Area |
| 64 | Owner ID Information |
| 892 | Reserved |

| PVR Record 800 ||
|---|---|
| Bytes | Description |
| 44 | Path Name | 811
| 6 | Volume Serial Number (Vol ID) | 812
| 1 | Next available File Directory Block | 813
| 3 | File Directory Group Address | 814
| 3 | Creation Date | 815
| 3 | Previous File Directory Group Address | 816
| 2 | Reserved | 817
| 1 | Media Type (Optical, Diskette or Tape) | 818
| 1 | Current Directory Entry | 819
| 12 | File Name | 851
| 1 | Reserved | 852
| 3 | File Length (in bytes) | 853
| 3 | Starting Block Address of the File | 854
| 3 | Number of Blocks | 855
| 6 | Creation Date/Time | 856
| 4 | Reserved |

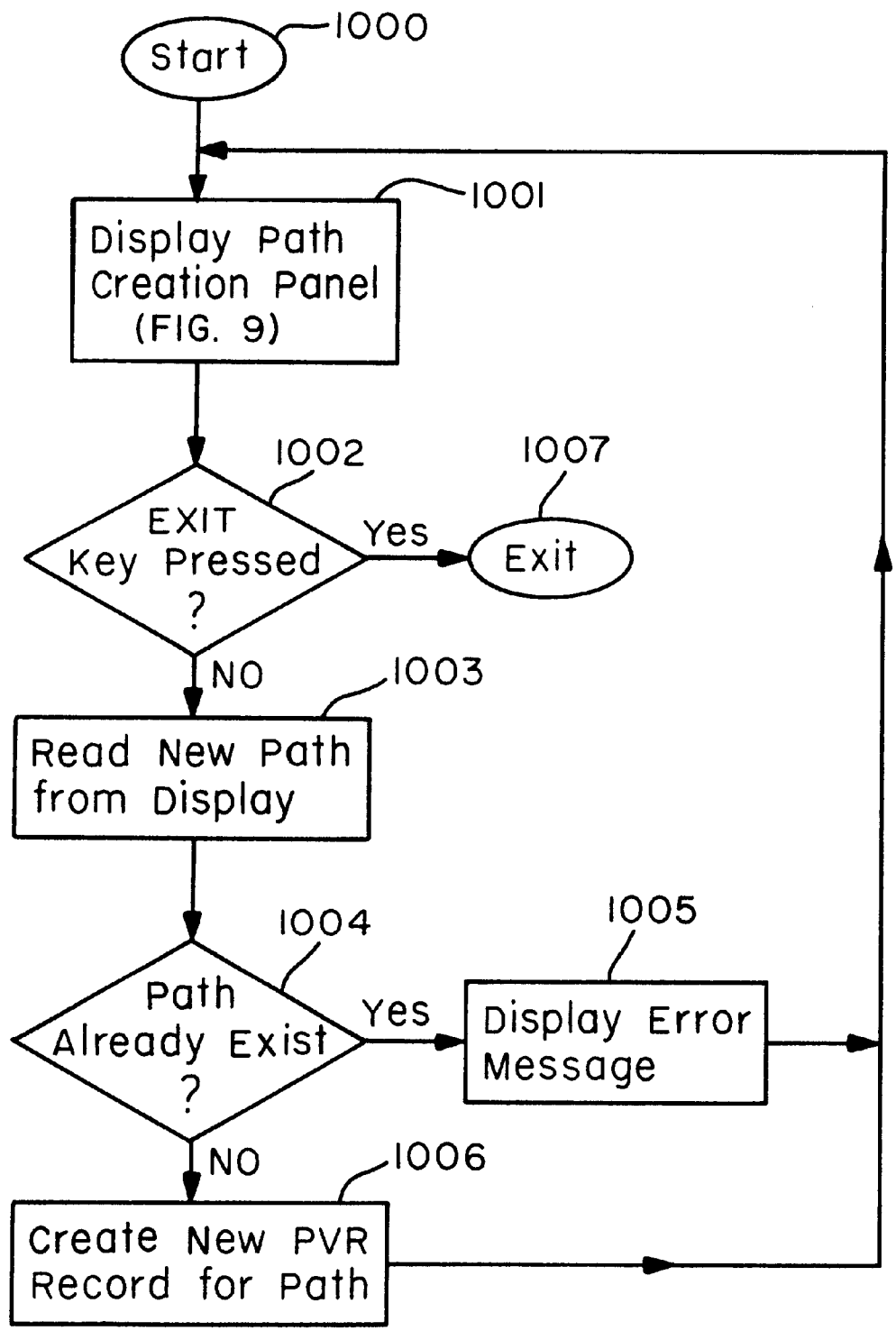
FIG. 10: Create New Path

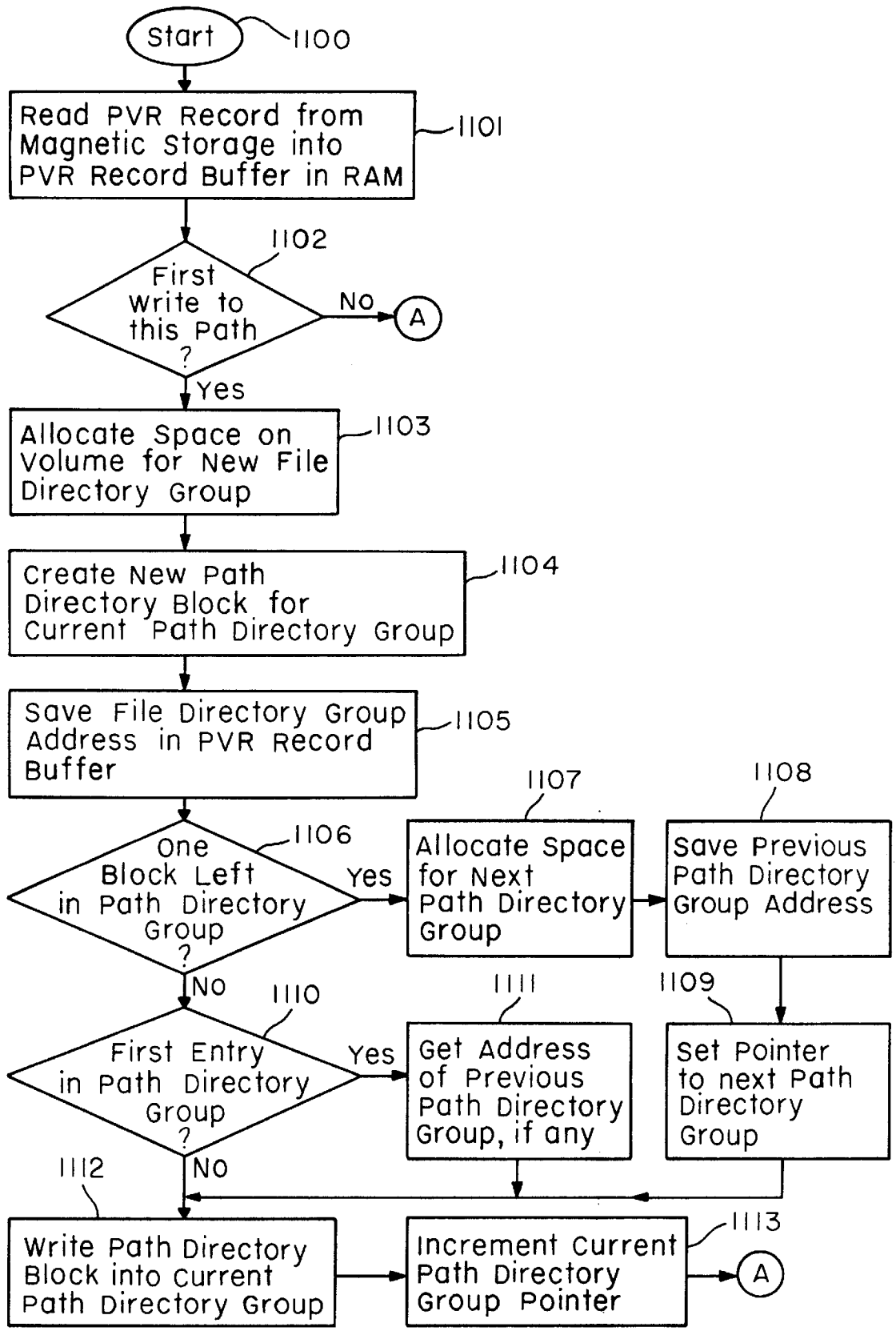
FIG. 11A: Write File Flow

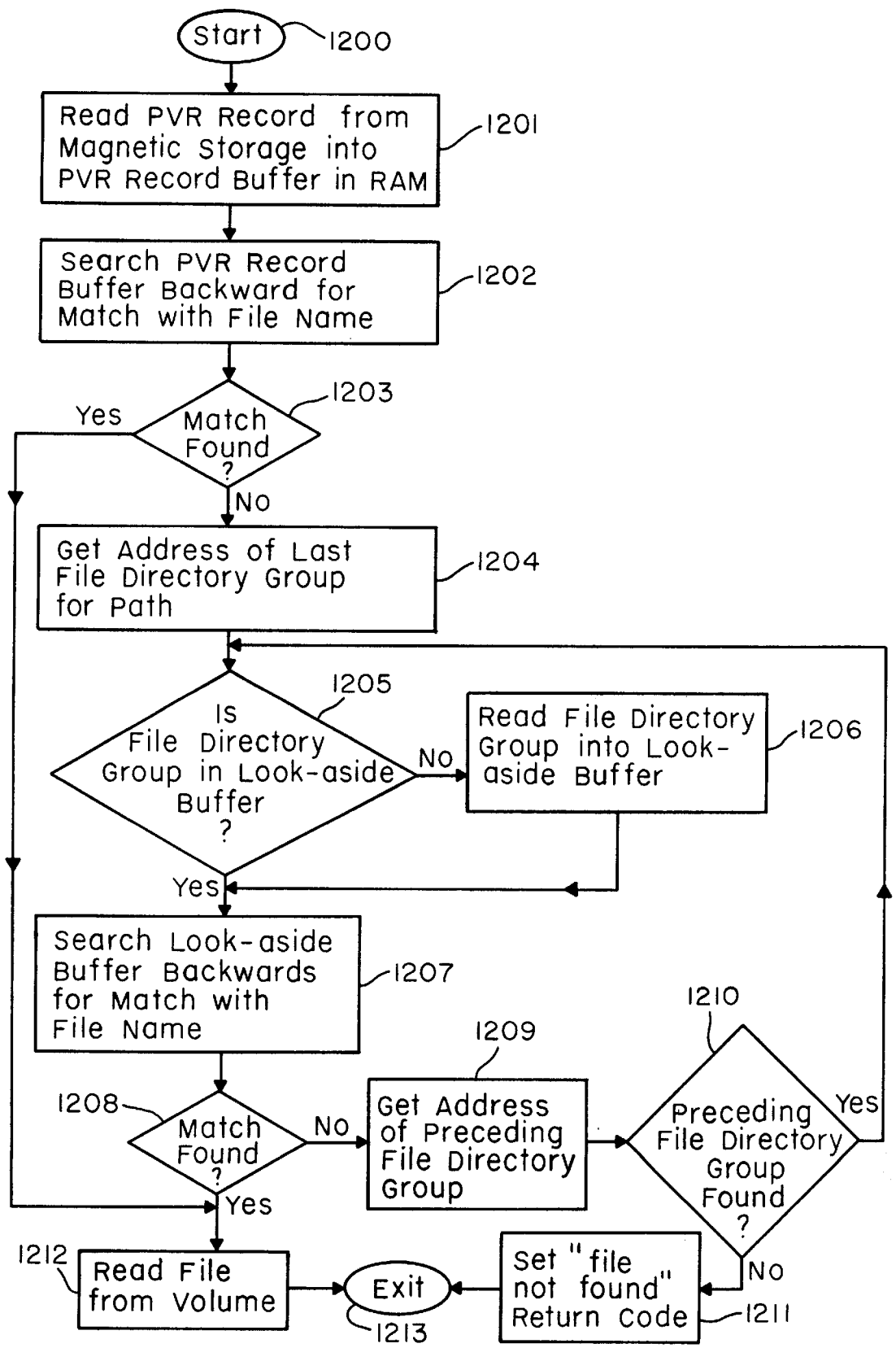
FIG. 12: Read File Flow 6,108,285

DIRECTORY STRUCTURE FOR WORM OPTICAL MEDIA

This is a continuation of application Ser. No. 07/325,601 filed on Mar. 20, 1989, now abandoned.

FIELD OF THE INVENTION

This invention relates to the data processing field. More particularly, this invention provides for the efficient utilization of WORM optical media through the use of a directory structure.

BACKGROUND OF THE INVENTION

Large capacity Write Once Read Mostly (also known as Write Once Read Many, or WORM) optical storage has recently become available at a. reasonable price. New applications have used WORM optical storage to efficiently and economically store vast amounts of data, such as image data, that would normally be archived in warehouses or basements on paper, x-rays, etc. A volume of data is normally stored on one side of a WORM optical disk.

One optical volume can store lip to 154,000 documents or 19,000 images. Over 2,700 conventional magnetic diskettes would be required to store this massive amount of data. When several optical disks are placed in an optical library or mass optical storage device (also known as a "jukebox", or MOSD), up to 20,000,000 documents can be stored.

Having the capability to store several thousand documents or other data files on a WORM volume is certainly nice, but one major problem still exists—organizing the files in such a manner that finding a file at a later time is easy, fast, and efficient. Previous attempts to solve this problem use a variety of directory structures. The unique requirements of WORM technology optical media prevent using a conventional directory structure since erasure of data in the directory is impossible.

One previous directory structure writes data forward from the beginning of the WORM volume and writes directory entries backward from the end of the WORM volume. The directory and the data grow towards each other at the middle of the volume. This structure has the advantage of not wasting space on the WORM volume, but the access time between finding a directory entry and finding the associated data is very long, since the average distance between directory entry and the data is ½ the entire disk. In addition, this structure does not allow for the efficient support of a multi-level tree structure containing several paths. Such a multi-level tree structure can be used to group related files together, and is an important organizational tool for optical disks.

Another previous directory struction segments the WORM volume into a series of interleaved directory areas and adjacent data areas. As files are placed in a data area, a directory entry associated with that file is placed in the adjacent directory area. When the last directory entry in the directory area is used, a new directory area and data area are created. No more data can be placed in the old data area, despite the fact that there usually is space available, since the adjacent directory area is filled. This structure has the advantage of a short access time between finding a directory entry and finding the associated data, since the directory and associated data are always located right next to each other on the disk. However, this structure wastes a lot of valuable space on the WORM volume. Although this structure can be used to support a multi-level tree structure containing several paths, it does not do so efficiently, as each directory area contains directory entries for all paths jumbled up together.

SUMMARY OF THE INVENTION

It is a principle object of the invention to provide for the efficient use of storage on a computer system.

It is another object of the invention to provide for the efficient utilization of WORM optical media through the use of a directory structure.

It is another object of the invention to provide a directory structure for WORM optical media that does not waste valuable space on the WORM volume.

It is another object of the invention to provide a directory structure for WORM optical media that minimizes the access time between finding a directory entry and finding the associated data on the WORM volume.

It is another object of the invention to provide a directory structure for WORM optical media that supports a multi-level tree structure containing several paths in an efficient and organized manner.

These and other objects are accomplished by the directory structure for WORM optical media disclosed herein.

A directory structure for WORM optical media is disclosed. A WORM volume contains a path directory group, a file directory group, and a data file area. The data file area can be followed by additional file directory groups and data file areas. The path directory group contains a plurality of path directory blocks. Each path directory block contains a path directory entry. Each path directory entry has location information about a file directory group.

A file directory group contains a plurality of file directory blocks. Each file directory block contains a plurality of file directory entries. Each file directory entry has location information about a data file located in a data file area. All data files associated with a file directory group are related in that they have the same path name. Therefore, a file directory group is created each time a new path is defined in the multi-level tree structure.

When a user defines the first path on the WORM volume, a file directory group is created for that path. A path directory entry pointing to this file directory group is written to the path directory group. Files having this path name are initially written into the first data file area next to this file directory group. The first data file area grows as data is written into it. When a second path is defined, the first data file area is closed and a second file directory group is created on the WORM volume next to the first data file area, thereby wasting little if any space. The path directory group is updated with a new path directory entry that points to this new file directory group. Files having this second path name are written into a growing second data area. If the user now wants a file having the first path name to be written to the disk, a file directory entry is placed in the first file directory group, but the file itself is written into the growing second data file area. In this manner, files are associated with directory entries by a common path name, not necessarily physical location on the disk, although files tend to be relatively close to their associated directory entry.

When a third path is defined, the second data file area is closed, a third file directory group is created, a path directory entry is added to the path directory group, and new files are written into the growing third data file region. A File directory entry is placed in either the first, second or third file directory group for each new file written to the WORM volume, depending on the path of the new file. This process continues as new paths are defined.

If a file directory group runs out of space to store any more file directory entries for its path, a new file directory group is allocated. The last block of the old file directory group points to the first block of the new file directory group, and vice versa. This doubly linked chain permits searching the file directory groups having a common path either backwards or forwards. This technique also allows for an unlimited number of data files per path on the WORM volume, subject only to the physical space limitations of the WORM volume.

Likewise, if a path directory group runs out of space to store any more path directory entries for new paths, a new path directory group is allocated. The last block of the old path directory group points to the first block of the new path directory group, and vice versa. This doubly linked chain permits searching the path directory groups either backwards or forwards. This technique also allows for an unlimited number of paths on the WORM volume, subject only to the physical space limitations of the WORM volume.

The access time of reading and writing files to a WORM volume is reduced in the preferred embodiment by the complementary use of magnetic storage. A portion of magnetic storage contains a path volume reference (PVR) table. The PVR table contains a plurality of PVR records. The PVR table contains one PVR record per defined path. Each PVR record contains a plurality of PVR file directory entries. When a new path is defined, a new PVR record is created, and space for a new file directory group is allocated on the WORM volume. As new data files for this path are written to the WORM volume into a data file area, the associated file directory entries are buffered into the PVR record as PVR file directory entries. When the PVR record is full, a new file directory block is written to the WORM volume in the file directory group.

When the user desires to read a data file from the WORM volume, the PVR table is first checked to see if the file name exists in a PVR file directory entry. If so, the location of the data file on the WORM volume is known, and there is no need to search either the path directory group or the file directory group on the WORM volume to read the data file. Even if the file name is not in a PVR file directory entry, the location of the correct file directory group can be determined from the PVR table, so the path directory group on the WORM volume need not be searched.

The access time of reading and writing files to a WORM volume is reduced further in the preferred embodiment by the use of random access memory (RAM) in addition to the PVR table located in magnetic storage. A first portion of RAM contains a PVR record buffer. The PVR record from the PVR table currently being operated upon is read into the PVR buffer in RAM. Subsequent operations to the PVR record take place in high speed RAM.

A second portion of RAM contains a look-aside buffer. The file directory group currently being operated upon is read from the WORM volume into the look-aside buffer in RAM. As before, when the user desires to read a data file from the WORM volume, the PVR table is first checked to see if the file name exists in a PVR file directory entry. If so, the location of the data file on the WORM volume is known, and there is no need to search the look-aside buffer in RAM or either the path directory group or the file directory group on the WORM volume to read the data file. If the file name is not in a PVR file directory entry, the file directory group containing a file directory entry which points to the desired file is read into the look-aside buffer in RAM. If the user next wants to read a file associated with the same file directory group, the location of the file on the WORM volume is located in the look-aside buffer, and the file can be read quickly and directly without searching the file directory group on the WORM volume.

BRIEF DESCRIPTION OF THE DRAWING

FIG. 5 shows the Volume Label Block of the invention.

FIG. 8 shows the PVR Record of the invention.

FIG. 10 shows a flowchart of how a new path is created in the invention.

FIGS. 11A–11B show a flowchart of how a file is written to a volume in the invention.

FIG. 12 shows a flowchart of how a file is read from a volume in the invention.

DESCRIPTION OF THE PREFERRED EMBODIMENT

Figure 1:
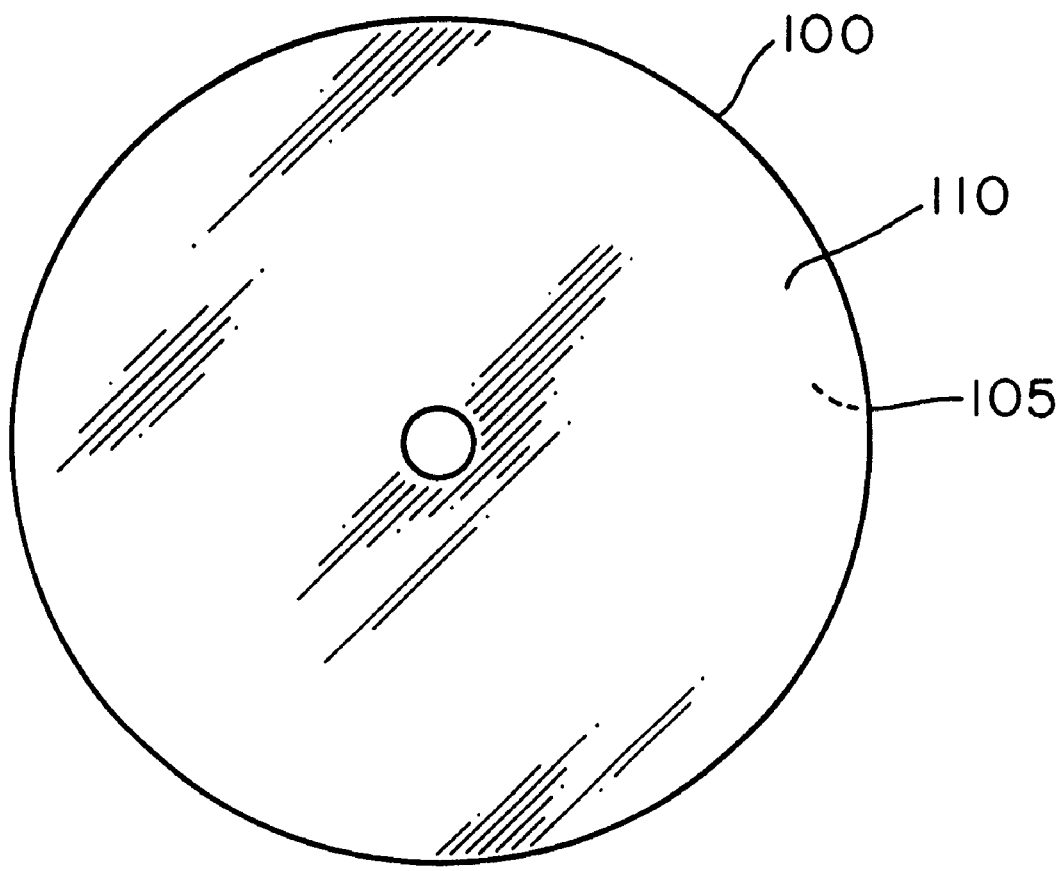
FIG. 1 shows an optical disk of the invention.

FIG. 1 shows optical disk 100 of the invention. Optical disk 100 is made of write once, read mostly (WORM) media and may contain data on both sides. WORM volume 110 in the preferred embodiment is one side of optical disk 100, and is given a volume name or serial number, such as "PAYROLL". A second volume 105 is located on the opposing side of optical disk 100.

Figure 2:
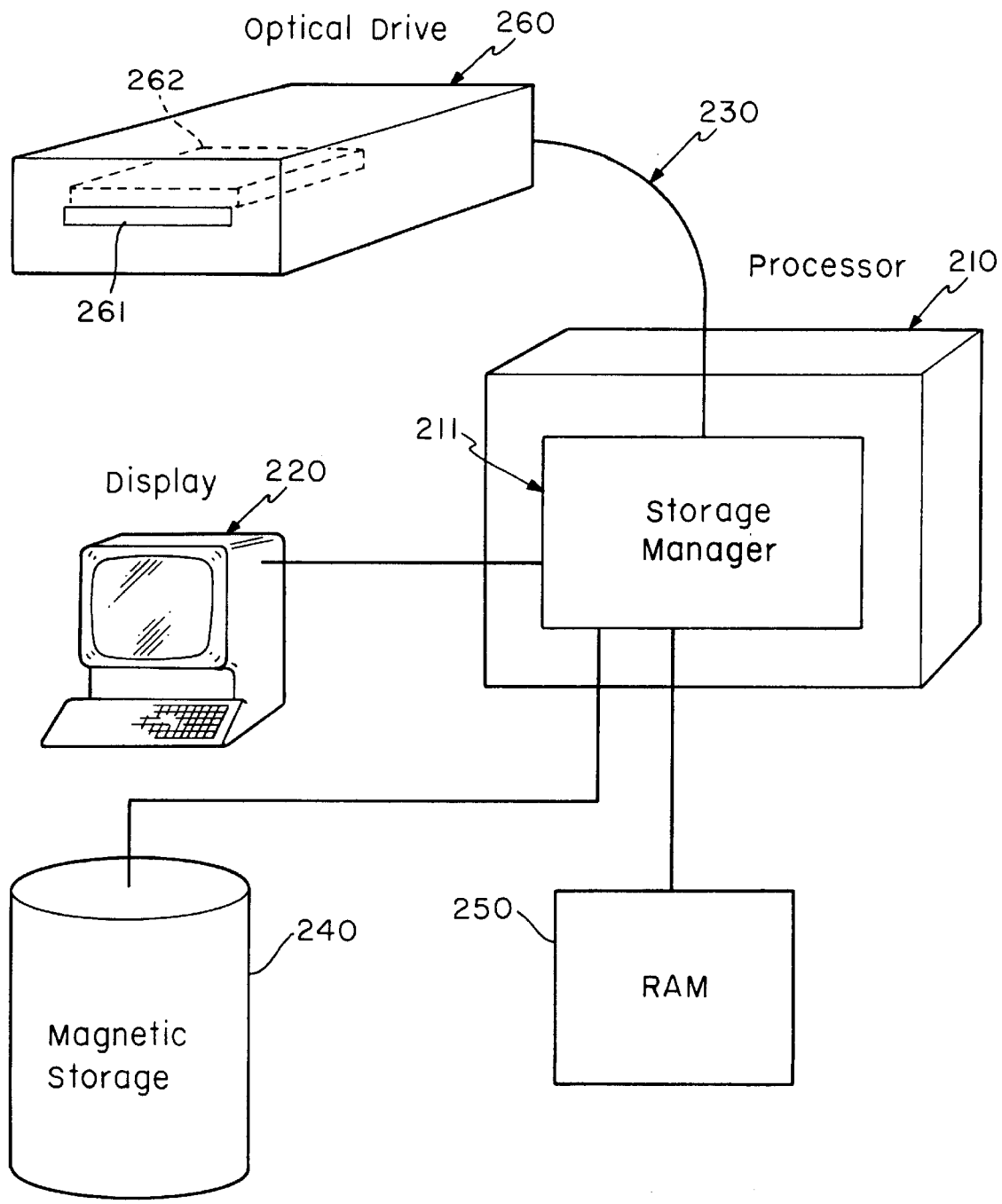
FIG. 2 shows a block diagram of the computer system of the invention.

FIG. 2 shows a block diagram of computer system 200 of the invention. Computer system 200 is made up of processor 210, display 220, optical attachment interface 230, magnetic storage 240, RAM 250, and optical drive 260. Optical drive 260 consists of optical disk entry slot 261, and optical media read/write mechanism 262. Information is written to or read from optical disk 100 by optical drive 260.

Processor 210 contains storage manager 211. Storage manager 211 controls accesses to optical drive 260 via optical attachment interface 230. Storage manager 211 also controls the complementary functions performed in magnetic storage 240 and RAM 250, as well as interfaces to the computer user via display 220. The operation of storage manager 211 will be discussed later in conduction with FIGS. 9–12.

Note that although direct connection lines are shown between storage manager 211 and display 220, optical drive 260, RAM 250 and magnetic storage 240, these connections can be made remotely over communications lines such as telephone lines, local area networks, etc. Note also that only processor 210 is shown, more than one processor and/or special purpose hardware may be used to perform the function of storage manager 211.

In the preferred embodiment, computer system 200 is an IBM 5363 computer with attached display and optical drive, although any computer system could be used.

Figure 3:
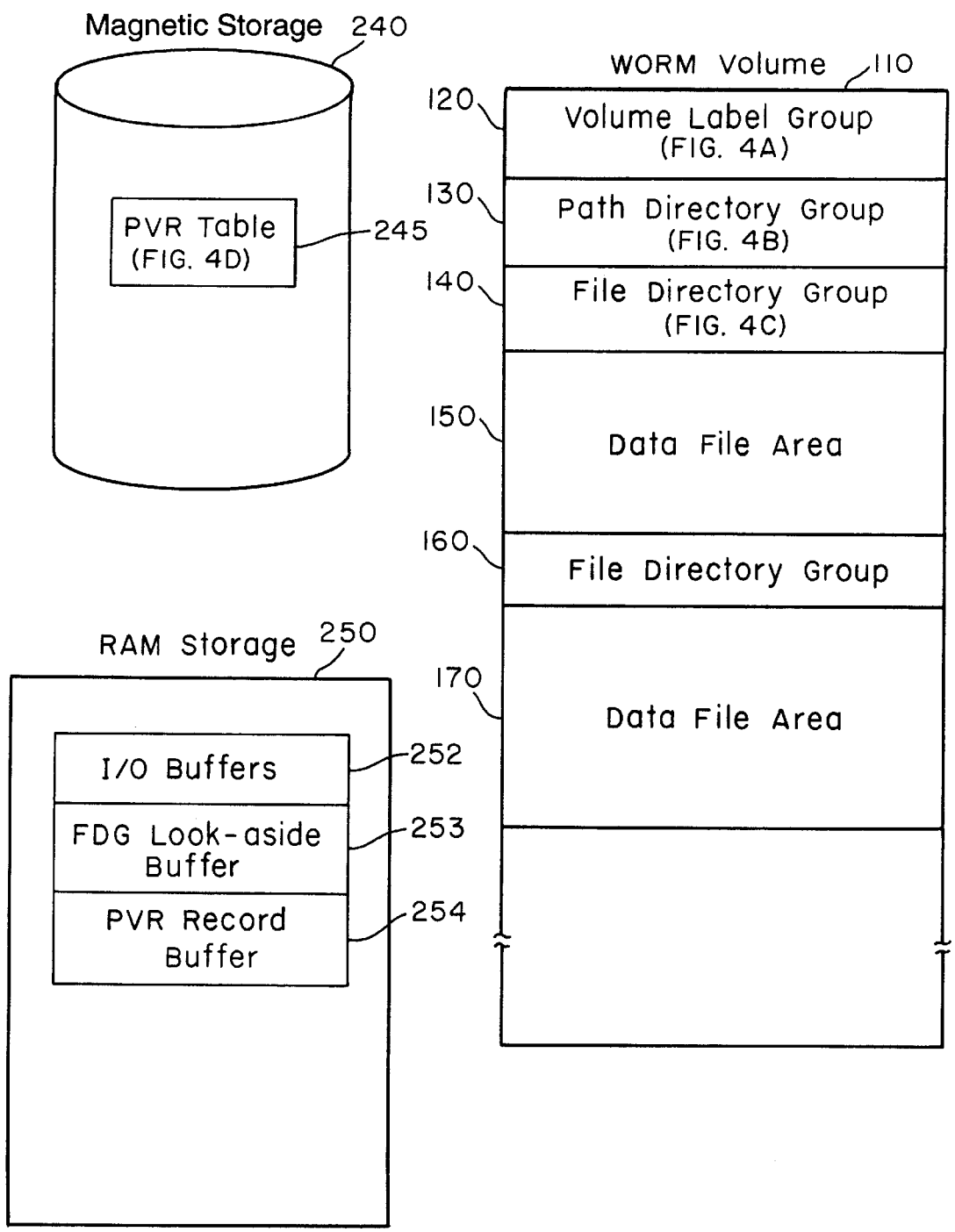
FIG. 3 shows an overall diagram of the data structures of the invention.

FIG. 3 shows an overview of the data structure used by storage manager 211 to manage data written to WORM volume 110. WORM volume 110 contains volume label group 120, path directory group 130, file directory group 140 and data file area 150. Data file area 150 can be followed by additional file directory groups and data file areas, as well as volume label groups and path directory groups, if needed.

Figure 4A:
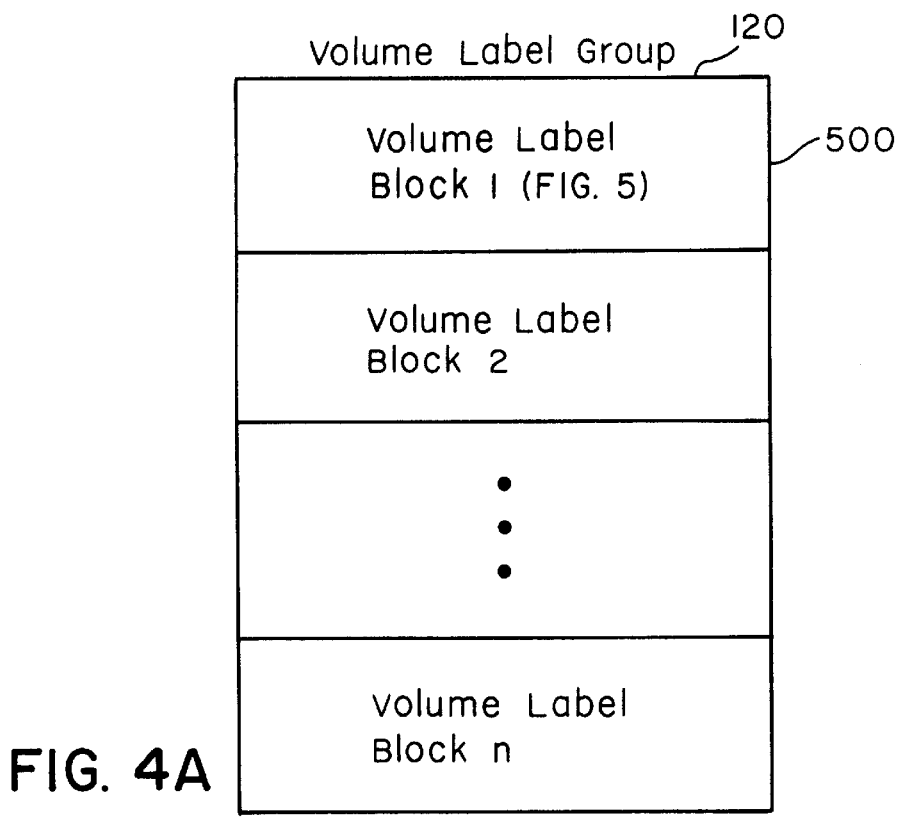
FIGS. 4A–4D show the data structures of the invention in more detail.

Volume label group 120 contains a plurality of volume label blocks, as shown in more detail in FIG. 4A. In the preferred embodiment, volume label group 120 is 32K Bytes in size, although any convenient size could be used. Each volume label block is 1K bytes in size, so up to 32 volume label blocks can reside in volume label group 120 in the preferred embodiment.

Since WORM volume 110 is write-once, the volume label cannot be erased if the user decides to change it. However, volume label group 120 provides extra space for the volume to be renamed or reinitialized up to 31 times by writing a new volume label block. The last volume label block is read to determine the volume name. In the unlikely event that a user desires to rename volume 110 more than 31 times, a new volume label group is allocated. The last block of the old volume label group points to the first block of the new volume label group. This chain permits searching the volume label groups forwards. This technique also allows for the volume to be renamed an unlimited number of times, subject only to the physical space limitations of the WORM volume.

The fields that make up volume label block 500 of FIG. 4A are shown in more detail in FIG. 5. Field 501 contains the string 'VOL1' which is used by storage manager 211 to verify that WORM volume 110 is of the proper format. Field 502 contains the name or serial number for WORM volume 110. Field 503 contains the date and field 504 contains the time this volume was last initialized. Field 505 contains the block address of the first path directory group 130. The rest of the information in the volume label block 500 is not relevant to this invention.

Figure 4B:
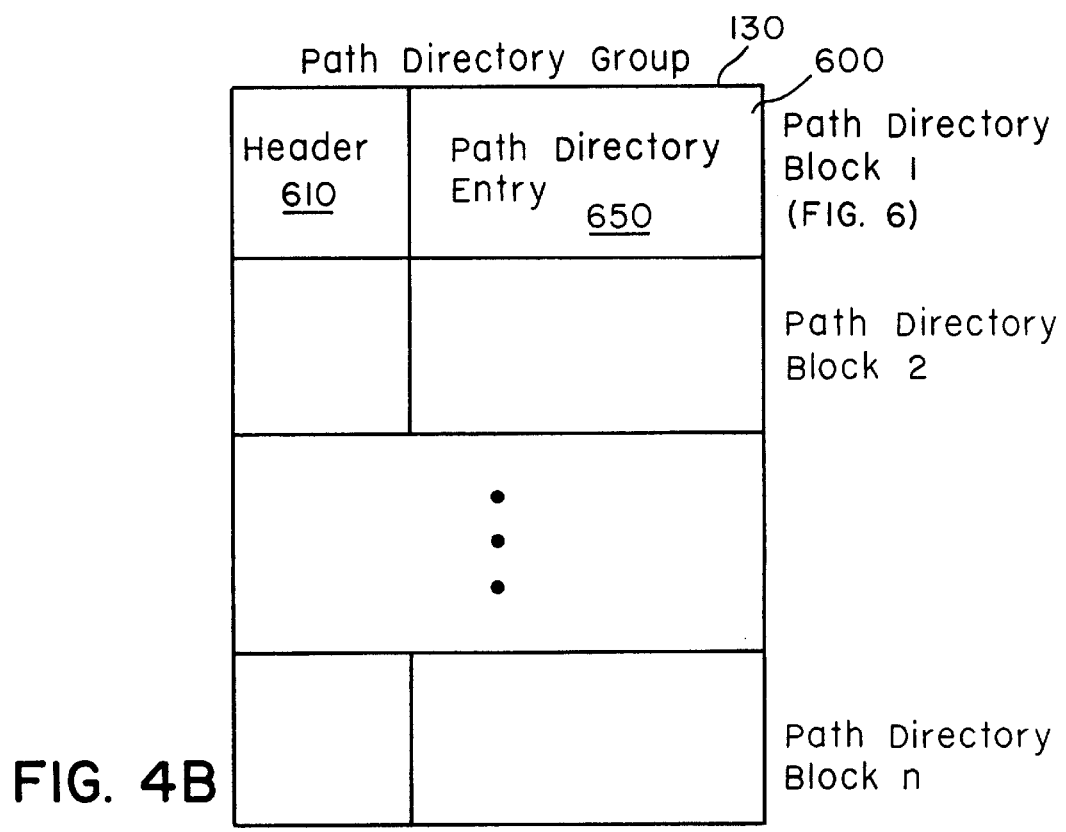

Referring again to FIG. 3, path directory group 130 contains a plurality of path directory blocks, as shown in more detail in FIG. 4B. In the preferred embodiment, path directory group 130 is 32K Bytes in size, although any convenient size could be used. Each path directory block is 1K bytes in size, so up to 32 path directory blocks can reside in path directory group 120.

One path directory block per defined path is placed in path directory group 130. Each path directory block contains location information that points to the file directory group associated with that path.

Figure 6:
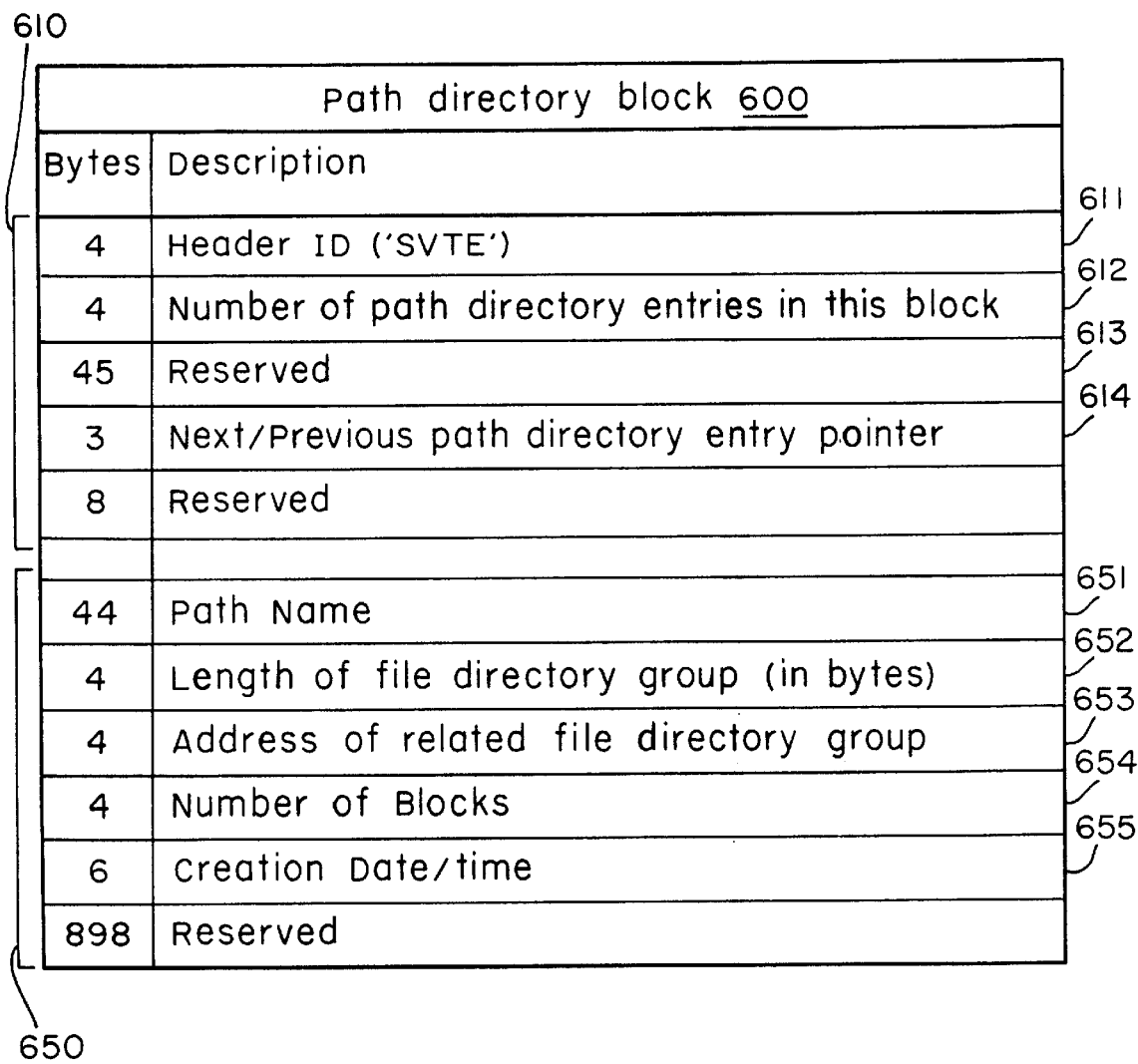
FIG. 6 shows the Path Directory Block of the invention.

Path directory block 600 contains path directory block header 610 and path directory entry 650. The fields that make up path directory block 600 of FIG. 4B are shown in more detail in FIG. 6.

Header 610 contains fields 611, 612, and 614. Field 611 contains the string 'SVTE' which defines this block as a valid path directory block. Field 612 contains the number of path directory entries contained in this block. In the preferred embodiment, only one path directory entry is contained in a path directory block. However, if more than one path directory entry is desired per path directory block, field 612 could contain a larger number, and the additional path directory entries would follow path directory entry 650 in path directory block 600.

Field 614 contains the pointer to the next or previous path directory block in the path directory group. This field is used to double chain multiple path directory groups, if any. If a path directory group runs out of space to store any more path directory blocks for new paths, a new path directory group is allocated. Field 614 allows the last block of the old path directory group to point to the first block of the new path directory group, and vice versa. This doubly linked chain permits searching the path directory groups either backwards or forwards. This technique also allows for an unlimited number of paths on the WORM volume, subject only to the physical space limitations of the WORM volume.

Path directory entry 650 contains fields 651–655. These fields provide location information about the file directory group for the specified path. Field 651 contains the name of the path for this path directory entry. An example of a path name would be DIV10/ROCHEST/DEPT917/MAR89. A path name up to 44 bytes can be used in field 651. Field 652 contains the length of the file directory group for this path in bytes. Field 653 contains the starting block address of the file directory group for this path. Field 654 contains the length of the file directory group for this path in blocks. Field 655 contains the date and time this path directory entry was written.

Figure 4C:
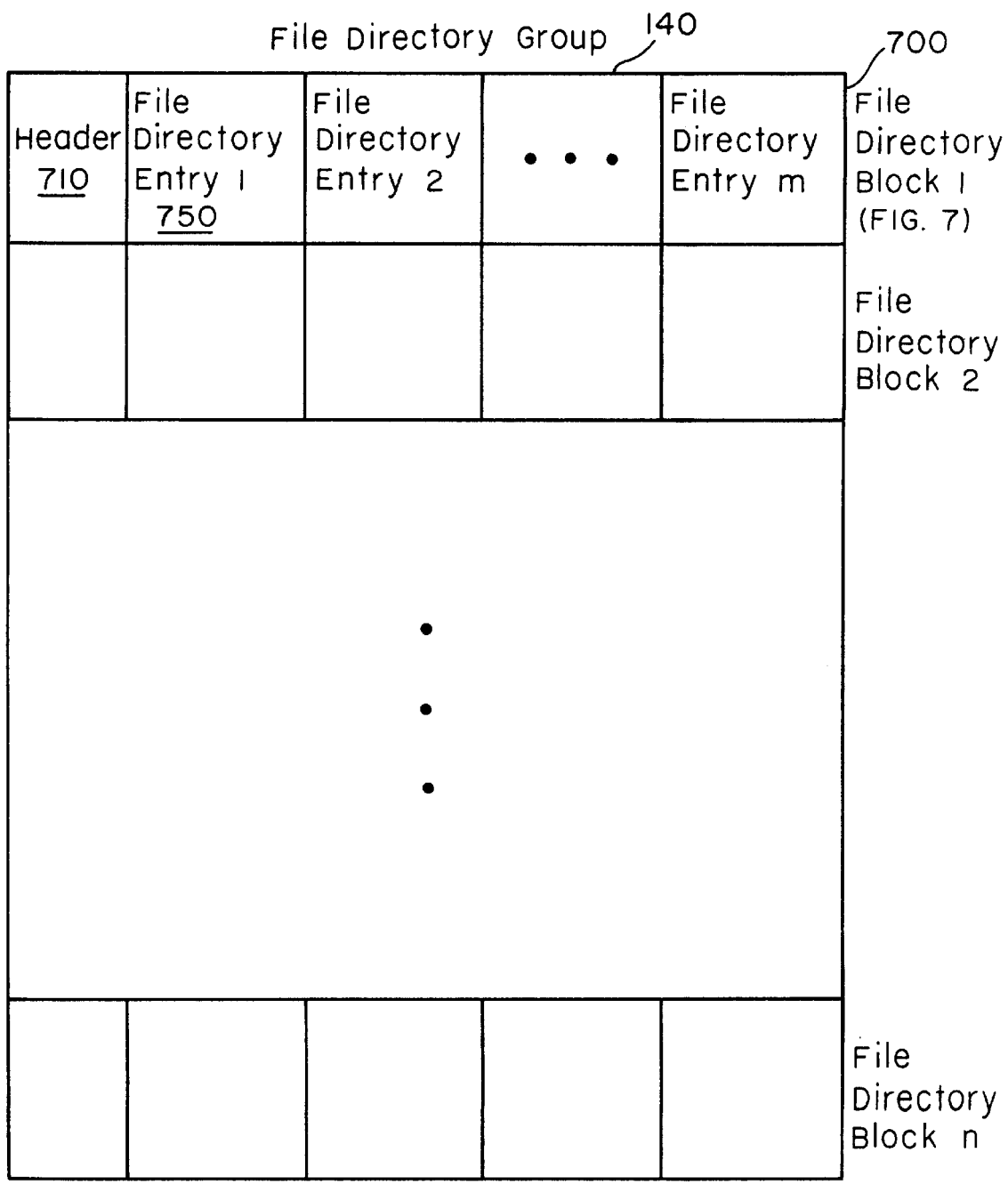

Referring again to FIG. 3, file directory group 140 contains a plurality of file directory blocks, as shown in more detail in FIG. 4C. In the preferred embodiment, file directory group 130 is 32K Bytes in size, although any convenient size could be used. Each file directory block is 1K bytes in size, so up to 32 file directory blocks can reside in file directory group 130.

One file directory block is placed in file directory group 130 for a plurality of data files. In the preferred embodiment, file directory block 700 contains file directory block header 710 and a plurality of file directory entries such as file directory entry 750. In the preferred embodiment there are 30 file directory entries per file directory block. Each file directory entry contains location information that points to a data file. Since there can be 32 file directory blocks per file directory group, and 30 file directory entries per file directory block, up to 960 data files can be referenced per file directory group. Each of these 960 data files all have the same path name. If a file directory group runs out of space to store any more file directory blocks for its path, a new file directory group is allocated. The last block of the old file directory group points to the first block of the new file directory group, and vice versa. This doubly linked chain permits searching the file directory groups having a common path either backwards or forwards. This technique also allows for an unlimited number of data files per path on the WORM volume, subject only to the physical space limitations of the WORM volume.

Figure 7:
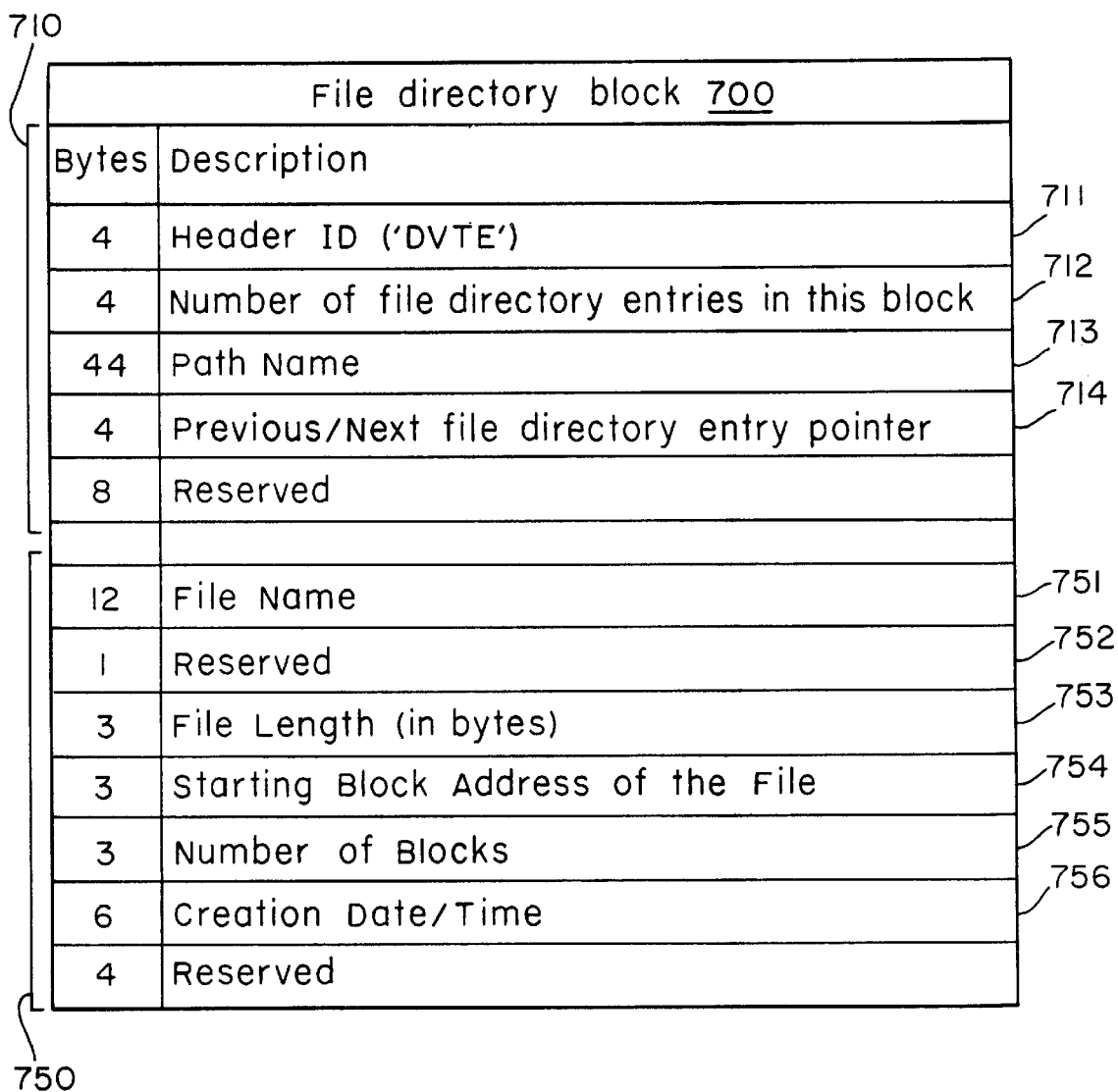
FIG. 7 shows the File Directory Block of the invention.

The fields that make up file directory block 700 are shown in more detail in FIG. 7. Header 710 contains fields 711–714. Field 711 contains the string 'DVTE' which defines this block as a valid file directory block. Field 712 contains the number of file directory entries contained in this block. This value may be set up to 30 in the preferred embodiment. Field 713 contains the path name related to this file directory group. All file directory blocks in a particular file directory group have the same path name. This path name is the same as the path directory block that points to the file directory group.

If a file directory group runs out of space to store any more file directory entries for new data files, a new file directory group for this path is allocated. Field 714 allows the last block of the old file directory group to point to the first block of the new file directory group, and vice versa, so double linked chaining of file directory groups for the same path can be done, as has been discussed.

Header 710 is followed by a plurality of file directory entries such as file directory entry 750. File directory entry 750 contains fields 751–756. These fields provide location information about a particular data file. Field 751 contains the name of the data file. An example of a data file name could be "SBerge". Combining this data file name with its path name (located in field 651 of path directory block 600) yields DIV10/ROCHEST/DEPT917/MAR89/SBerge, and, since it is on a WORM volume named "PAYROLL", contains the March 1989 payroll information of employee Sue Berge, who is located in Rochester in Department 917, Division 10. Subsequent file directory entries may be used to point to data files containing the March 1989 payroll information of other employees in Department 917.

Field 753 contains the length of the data file in bytes. Field 754 contains the starting address of the data file. Field 755 contains the length of the data file in blocks. Field 756 contains the date and time this path directory entry was written.

Referring again to FIG. 3, a summary of the interrelation between path directory groups, file directory groups and data file areas will now be discussed. When a user defines the first path on the WORM volume, file directory group 140 is created for that path. A path directory entry pointing to file directory group 140 is written to path directory group 130. Files having this path name are initially written into data file area 150. Data file area 150 grows as data is written into it. When a second path is defined, data file area 150 is closed and file directory group 160 is created on the WORM volume next to data file area 150, thereby wasting little if any space. Path directory group 130 is updated with a new path directory entry that points to file directory group 160. Data files having this second path name are written into growing data file area 170. If the user now wants a file having the first path name to be written to the disk, a file directory entry is placed in a file directory block in file directory group 140, but the file itself is written into the data file area 170. In this manner, files are associated with file directory entries by a common path name, not necessarily physical location on the disk, although files tend to be relatively close to their associated directory entry. This approach does sacrifice some access time in order to implement a directory structure organized by paths. However, this slightly longer access time is more than recouped with the use of PVR table 245, file directory group look-aside buffer 253, and PVR record buffer 254, as will be discussed in more detail later.

When a third path is defined, data file area 170 is closed, a third file directory group is created, a path directory entry is added to path directory group 130, and new files are written into the growing third data file area. A file directory entry is placed in either file directory group 130, file directory group 140 or the third file directory group for each new file written to the WORM volume, depending on the path of the new file. This process continues as new paths are defined. If in the preferred embodiment more than 32 paths are defined, a new path directory group is allocated, as has been discussed.

Referring again to FIG. 3, the operation of PVR table 245 located in magnetic storage 240 will now be discussed. A portion of magnetic storage 240 contains path volume reference (PVR) table 245. PVR table 245 is shown in more detail in FIG. 4D. PVR table 245 contains a plurality of PVR records such as PVR record 800. PVR record 800 contains PVR header 810 and a plurality of PVR file directory entries such as PVR file directory entry 850.

PVR table 245 contains one PVR record per defined path for all WORM volumes. Each PVR record contains a plurality of PVR file directory entries. When a new path is defined, a new PVR record is created, and space for a new file directory group is allocated on the WORM volume. As new data files for this path are written to the WORM volume into a data file area, the associated file directory entries are buffered into the PVR record as PVR file directory entries. When the PVR record is full, a new file directory block is written to the WORM volume in the file directory group.

When the user desires to read a data file from the WORM volume, the PVR table is first checked to see if the file name exists in a PVR file directory entry. If so, the location of the data file on the WORM volume is known, and there is no need to search either the path directory group or the file directory group on the WORM volume to read the data file. Even if the file name is not in a PVR file directory entry, the location of the correct file directory group can be determined from the PVR table, so the path directory group on the WORM volume need not be searched.

The fields that make up PVR record 800 are shown in more detail in FIG. 8. Header 810 contains fields 811–819. Field 811 contains the path name for all of the PVR file directory entries in this PVR record. Field 812 contains the volume name or serial number of the WORM volume to which this path was assigned. Field 813 contains the address of the next file directory block to be written. Field 814 contains the block address of the current file directory group. Field 815 contains the creation date of this PVR record. Field 816 contains the address of the previous file directory group, if any, for this path. This address is stored to allow chaining of all file directory groups per path, as has been discussed. This backward chain is used when searching for the directory entry related to a desired data file. The directory entry must be found to locate the address of the data file on the WORM volume 110.

Figure 4D:
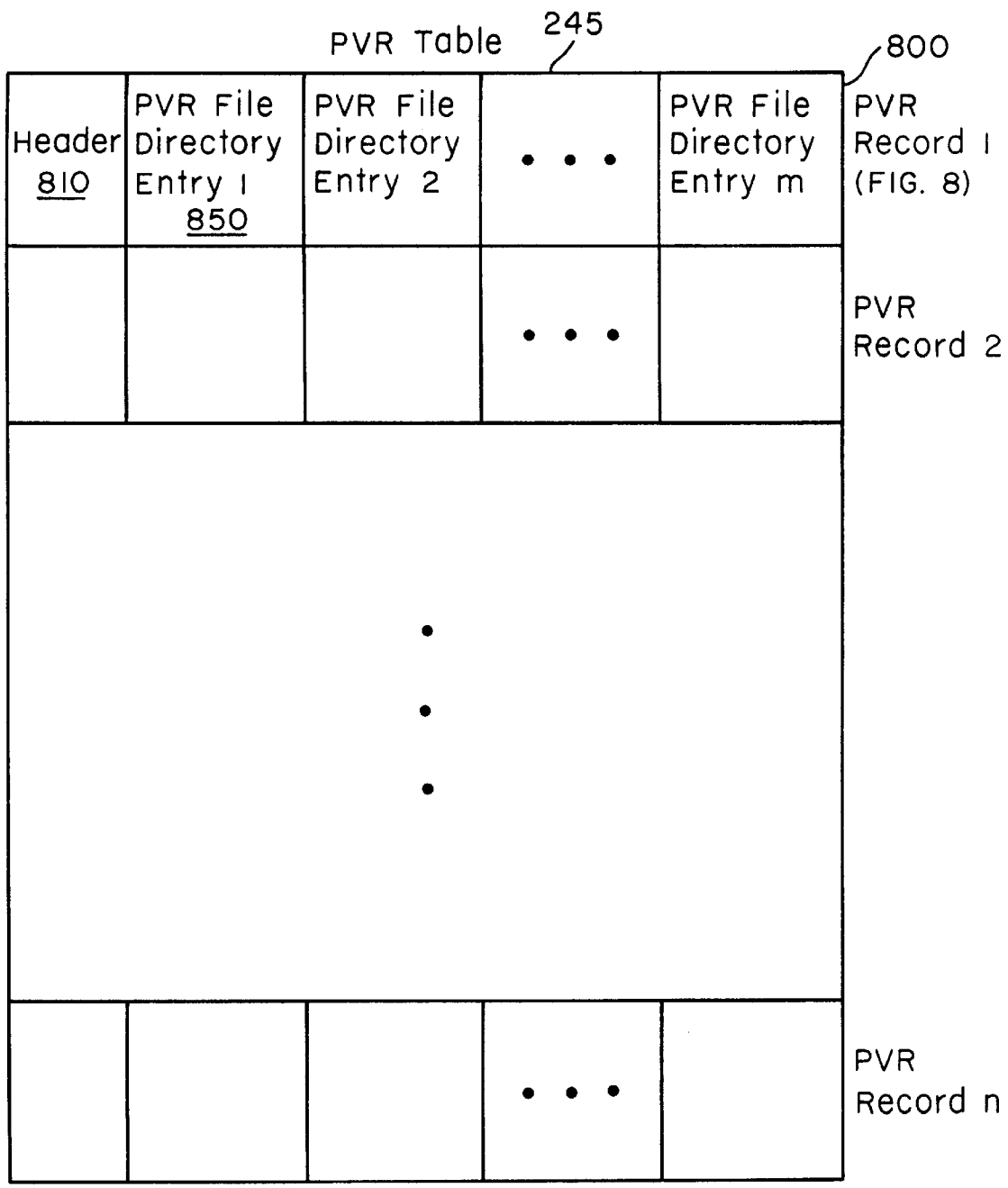

Field 818 contains an indicator for the media type. In the preferred embodiment, this value indicates an optical disk, although this value could indicate other media such as diskette or tape. Field 819 points to the current PVR file directory entry (either PVR file directory entry 850 or a subsequent PVR file directory entry) located in PVR record 800 (FIG. 4D).

PVR file directory entry 850 contains the same fields as file directory entry 750 of FIG. 7. Fields 851–856 in PVR file directory entry 850 are the same as fields 751–756 in file directory entry 750, which have already been discussed.

Referring again to FIG. 3, the operation of PVR record buffer 254 located in RAM storage 250 will now be discussed. The PVR record from PVR table 245 located in magnetic storage 240 currently being operated upon is read into PVR record buffer 254 in RAM. Subsequent operations to the PVR record take place in high speed RAM.

The operation of file directory group look-aside buffer 253 located in RAM storage 250 will now be discussed. The file directory group currently being operated upon is read from the WORM volume into file directory group look-aside buffer 253. As before, when the user desires to read a data file from the WORM volume PVR table 245 is first checked to see if the file name exists in a PVR file directory entry. If so, the location of the data file on the WORM volume is known, and there is no need to search look-aside buffer 253 or either the path directory group or the file directory group on the WORM volume to read the data file. Since each PVR record only stores the directory information about the last 30 files written to a particular path, and an unlimited number of files can have the same path (if file directory groups are chained together, as discussed above), the PVR record for the desired path will often not contain the directory information for the desired file. If the file name is not in a PVR file directory entry, the file directory group containing a file directory entry which points to the desired file is read into look-aside buffer 253. If the user next wants to read a file associated with the same file directory group, a copy of the file directory group for the desired file is already located in the look-aside buffer, and the file can be located quickly and directly without reading the file directory group from the WORM volume.

Figure 9:
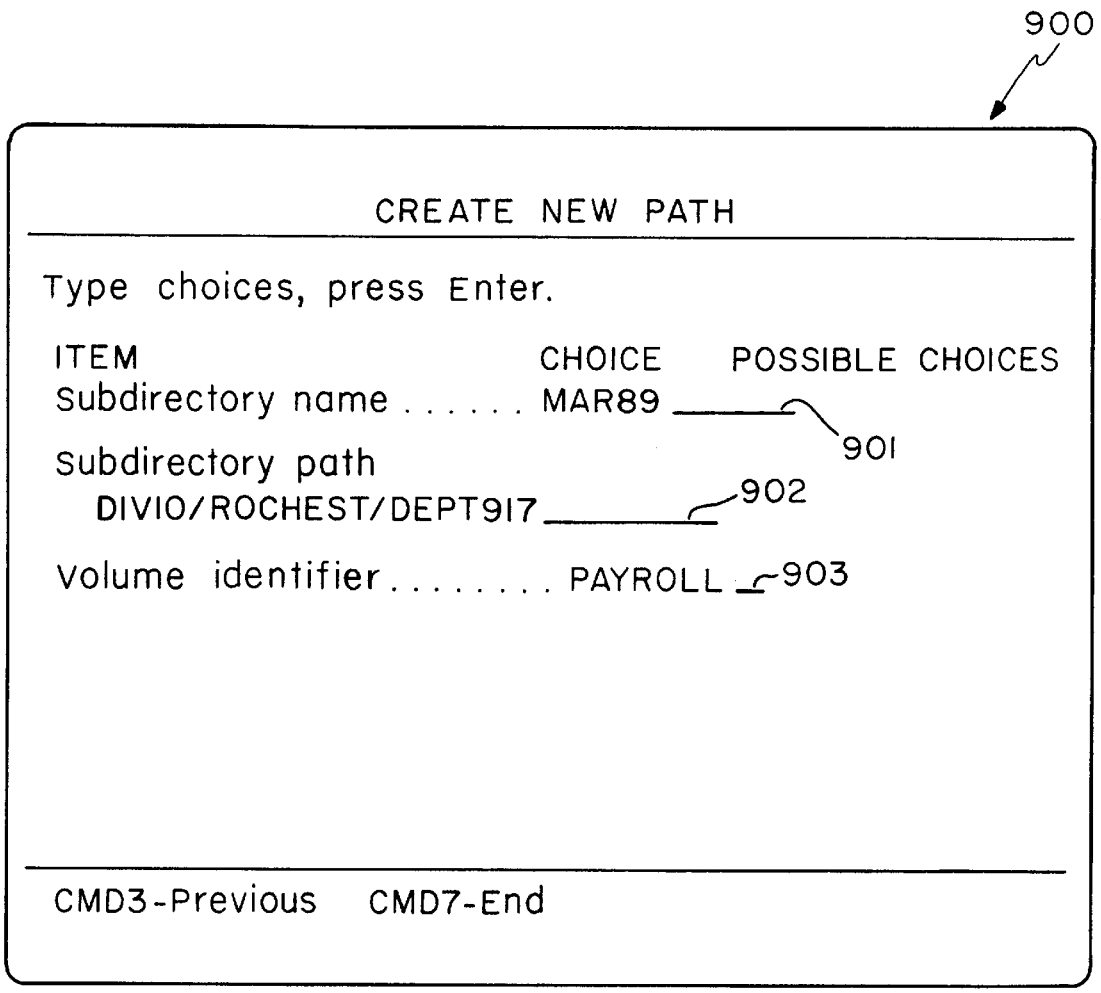
FIG. 9 shows a screen panel for entering a new path as displayed to a user.

FIGS. 9–12 show how the directory structure described above is used to create a new path, write a data file to a WORM volume, and read a data file from a WORM volume. FIG. 9 shows screen panel 900 for entering a new path as displayed to a user on display 220. The user enters a new subdirectory name in field 901. The user also enters the path name that should contain the new subdirectory in field 902. If the subdirectory does not already exist in the specified path, then a new path is formed by appending the new subdirectory name entered in field 901 to the path name entered in field 902. This new path will be created on the volume entered in field 903. For example the user in FIG. 9 has entered a new subdirectory name of MAR89 in field 901, which is appended to the existing path DIV10/ROCHEST/ DEPT917/shown in field 902. A new path called DIV10/ ROCHEST/DEPT917/MAR89 is created on the WORM volume specified in field 903 called PAYROLL.

FIG. 10 shows the flowchart of how storage manager 211 creates a new path. Block 1001 displays panel 900 (FIG. 9) into which the user enters a new path name. Block 1002 checks whether an exit key was pressed, and if it was, exits through block 1007. If the exit key was not pressed, block 1003 reads the new path name from fields 901 and 902 for the volume specified in field 903. Block 1004 checks for a duplicate path name, and if one is found, block 1005 displays an error message. Control then returns to block 1001 to redisplay panel 900 for possible entry of another path name. If the path doesn't exist, block 1006 creates a new PVR record in PVR table 245 (FIGS. 3 and 4D) for this new path. Control then returns to block 1001 to redisplay panel 900 for possible entry of another path name.

Figure 11B:
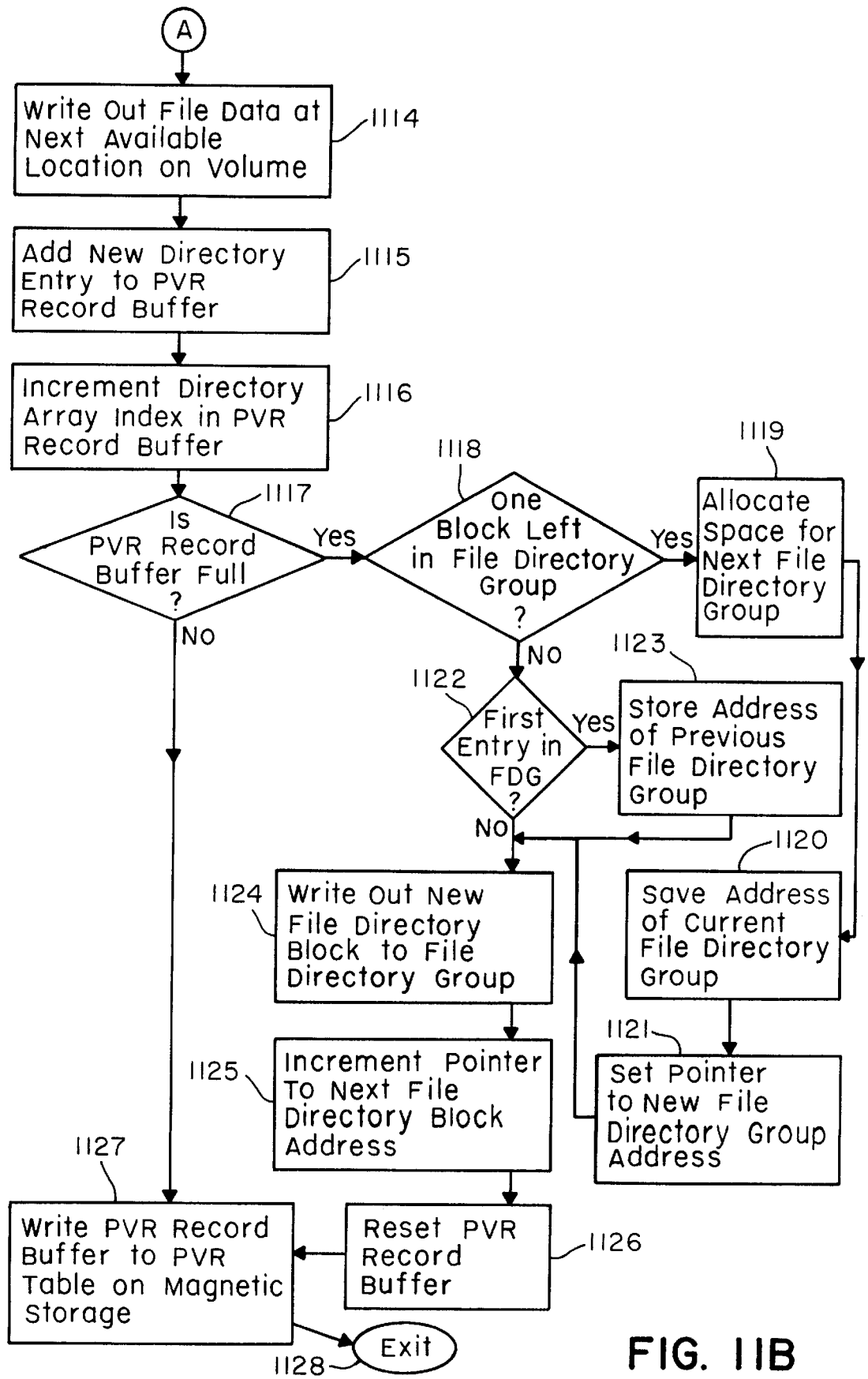

FIGS. 11A–11B show a flowchart of how storage manager 211 processes a request to write a data file to WORM volume 110. Block 1101 reads the PVR record having the path of the file to be written from PVR table 245 (FIGS. 3 and 4D) into PVR record buffer 254 in RAM 250 (FIG. 3). This record contains the descriptive information about the path that will contain the data file, as has been discussed (FIG. 8). Block 1102 checks field 814 (FIG. 8) in PVR record buffer 254 to determine if this is the first time the path has been used. If field 814 is equal to zero, the path has not previously been used. In this case, block 1103 allocates space on WORM volume 110 for a new file directory group.

Block 1104 creates a new path directory block for the path directory group which points to this new file directory group, but this block is not written to the path directory group on the WORM volume yet. The fields of header 810 (FIG. 8) of PVR record 800 are filled with the necessary information. Field 611 of header 610 of path directory block 600 will be set to the string 'SVTE' to properly identify the path directory block.

Block 1105 stores the address of the new file directory group in field 814 of the PVR record (FIG. 8). Block 1106 checks if only one block is left in the path directory group. If yes, block 1107 allocates space for the next path directory group. Block 1108 saves the address of the current path directory group. Block 1109 stores the address of the next path directory group in the last path directory block in field 614, and flow of control jumps to block 1112.

If more than one path directory block is available in the path directory group, block 1110 checks if this will be the first path directory block written in this path directory group. If so, block 1111 gets the address of the previous path directory group, if any was saved by a previous execution of block 1108, in preparation for writing into in field 614 of the new path directory group. This effectively chains the path directory groups together, as has been discussed. If no other previous path directory groups exist, block 1108 is never executed and a value of all zeros is stored in field 614. A value of all zeros is used to indicate end-of-chain. Block 1112 writes out the new path directory block to the current path directory group. Block 1113 increments a current path directory group pointer. At this point, all path directory group processing is complete.

Block 1114 writes the data file to the next available location in a data file area on WORM volume 110. This may occur as a single operation or result in many calls to the storage manager to process the request, depending on the size of the file.

Block 1115 adds a new PVR file directory entry to the PVR record buffer. Block 1116 increments field 819 (FIG. 8) to the next PVR file directory entry. Block 1117 checks if the PVR record buffer is full of PVR file directory entries. If yes, block 1118 checks if only one file directory block is left in the file directory group. If only one block is left, block 1119 allocates space for a new file directory group. Block 1120 saves the address of the current file directory group. Block 1121 prepares to set the pointer in field 714 of the file directory block (FIG. 7) to the new file directory group address. This provides the forward chaining of file directory groups having the same path, as has been discussed.

If more than one file directory block is left in the file directory group, block 1122 checks if this is the first file directory block written to this file directory group. If yes, block 1123 stores the address of the previous file directory group, if any has been stored in block 1120, into field 714. This provides the backward chaining of file directory groups having the same path, as has been discussed. In the case there are no previous file directory groups, block 1120 was never executed and a value of all zeros is stored in field 714. A value of all zeros is used to indicate end-of-chain.

Block 1124 writes out the file directory block (which contains 30 file directory entries, since block 1117 was answered affirmatively) to the file directory group for this path on WORM volume 110.

Block 1125 increments field 813 in the PVR record to the address of the next file directory block to be written. Block 1126 resets the PVR buffer to indicate completion of writing a file directory block and field 819 is reset to one (FIG. 8). Block 1127 writes the PVR record buffer back to the PVR record stored in magnetic storage 240. Block 1128 exits the program.

FIG. 12 shows a flowchart of how storage manager 211 processes a request to read a data file from WORM volume 110. Block 1201 reads the PVR record having the path of the file to be written from PVR table 245 (FIGS. 3 and 4D) into PVR record buffer 254 in RAM 250 (FIG. 3). This record contains the descriptive information about the path that will contain the data file, as has been discussed (FIG. 8). Block 1202 searches the PVR file directory entries in the PVR buffer for the file directory entry associated with the data file to be read. This search is performed backwards to guarantee that the most recently updated version of the file is read.

Block 1203 checks if the correct PVR file directory entry was found. If so, the file is read from WORM volume 110 using the directory information contained in the PVR table in block 1212 and the program exits in block 1213. If the correct PVR file directory entry was not found, the address of the last file directory group for this path is contained in the PVR record buffer in field 714. is obtained in block 1204. Block 1205 checks to see if the file directory group is currently resident in file directory group look-aside buffer 253 located in RAM 250. If not, block 1206 reads the file directory group associated with the data file to be read into look-aside buffer 253.

Block 1207 searches look-aside buffer 253 for the file directory entry associated with the data file to be read. The search is done from the back of the look-aside buffer towards the front, thereby assuring that the most recently updated version of the data file is read. Block 1208 checks to see if the file directory entry was found. If the file directory entry is found, the file is read from WORM volume 110 using the directory information contained in look-aside buffer 253, and the program exits in block 1213.

If the file directory entry is not found, such as when more than one file directory group exists for a path and the file is in a preceding file directory group, block 1209 gets the address of the previous file directory group from field 714 of the file directory block located in the front of the look-aside buffer. Block 1210 analyzes the result obtained in block 1209 and determines if a previous file directory group exists. If yes, control is passed back to block 1205, where the search for the file directory entry on the preceding file directory group continues. If block 1210 determines that no preceding file directory groups exist, a 'file not found' return code is set in block 1211 and the program exits in block 1213.

While this invention has been described with respect to the preferred embodiment, it will be understood by those skilled in the art that various changes in detail may be made therein without departing from the spirit, scope and teaching of the invention. Accordingly, the herein disclosed is to be limited only as specified in the following claims.

What is claimed is:

1. A computer system comprising:

magnetic storage media;

a write once, read mostly (WORM) volume, further comprising:

a plurality of data file areas located on said WORM volume, each of said plurality of data file areas containing a plurality of data files;

a plurality of file directory groups located on said WORM volume, each of said plurality of file directory groups comprising a path name and a plurality of file directory blocks, each of said plurality of file directory blocks containing a plurality of file directory entries containing location information regarding selected data files; and a path volume reference (PVR) table stored within said magnetic storage media, said path volume reference (PVR) table including a path volume reference (PVR) record for each path for buffering a plurality of file directory entries until a file directory block is created and written to a file directory group on said WORM volume, an address for a next file directory group to be written and an address for a previous file directory group, if any, wherein all file directory groups within a path are chained.

2. The computer system according to claim 1, further including a high speed memory and a path volume reference (PVR) record buffer stored within said high speed memory for storing a selected path volume reference (PVR) record in order to permit high speed operations within said stored path volume reference (PVR) record.

3. A computer system according to claim 2, further including a file directory group look-aside buffer stored within said high speed memory for storing a selected file directory group in order to permit high speed operations within said stored file directory group.

4. A method for managing a directory for a write once, read mostly (WORM) volume in a computer system having magnetic storage media, said method comprising the steps of:

establishing a plurality of data file areas within said WORM volume, each of said plurality of data file areas containing a plurality of data files;

establishing a plurality of file directory groups within said WORM volume, each of said plurality of file directory groups comprising a path name and a plurality of file directory blocks, each of said plurality of file directory blocks containing a plurality of file directory entries containing location information regarding said selected data files; and creating a path volume reference (PVR) table stored within said magnetic storage media, said path volume reference (PVR) table including a path volume reference (PVR) record for each path for buffering a plurality of file directory entries until a file directory block is created and written to a file directory group on said WORM volume, an address for a next file directory group to be written and an address for a previous file directory group, if any, wherein all file directory groups within a path are chained.

5. The method for managing a directory for a write once, read mostly (WORM) volume in a computer system according to claim 4, wherein said computer system includes a high speed memory and further including the step of establishing a path volume reference (PVR) record buffer within said high speed memory for storing a selected path volume reference (PVR) record in order to permit high speed operations within said stored path volume reference (PVR) record.

6. The method for managing a directory for a write once, read mostly (WORM) volume in a computer system according to claim 5, further including the step of establishing a file directory group look-aside buffers within said high speed memory for storing a selected file directory group in order to permit high speed operations within said stored file directory group.

* * * * *